United States Patent
Zhang et al.

(10) Patent No.: US 12,524,130 B2
(45) Date of Patent: Jan. 13, 2026

(54) METHOD, APPARATUS AND DEVICE AND STORAGE MEDIUM FOR REAL-TIME INFORMATION INTERACTION

(71) Applicant: BEIJING ZITIAO NETWORK TECHNOLOGY CO., LTD., Beijing (CN)

(72) Inventors: Yang Zhang, Beijing (CN); Yunfei Li, Beijing (CN); Longbo Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 399 days.

(21) Appl. No.: 18/013,746

(22) PCT Filed: Dec. 20, 2021

(86) PCT No.: PCT/CN2021/139615
§ 371 (c)(1),
(2) Date: Dec. 29, 2022

(87) PCT Pub. No.: WO2022/143255
PCT Pub. Date: Jul. 7, 2022

(65) Prior Publication Data
US 2024/0058709 A1 Feb. 22, 2024

(30) Foreign Application Priority Data
Dec. 30, 2020 (CN) .......... 202011616257.1

(51) Int. Cl.
*G06F 3/0482* (2013.01)
(52) U.S. Cl.
CPC .................. *G06F 3/0482* (2013.01)
(58) Field of Classification Search
CPC ........ G06F 3/0482; A63F 13/87; A63F 13/86; H04N 21/2187
See application file for complete search history.

(56) References Cited

U.S. PATENT DOCUMENTS 9,167,208 B2 * 10/2015 Pino, Jr. .............. H04N 21/8545
9,503,414 B1 * 11/2016 Ku ........................ H04L 51/216
(Continued)

FOREIGN PATENT DOCUMENTS

CN       103997691 A     8/2014
CN       104423814 A     3/2015
(Continued)

OTHER PUBLICATIONS

International Search Report in PCT/CN2021/139615, mailed Mar. 16, 2022, 5 pages.

*Primary Examiner* — Akelaw Teshale
(74) *Attorney, Agent, or Firm* — Astute IP Law Group

(57) ABSTRACT

Method, apparatus, device, storage-medium for real-time information interaction are provided. The method includes: determining a first auxiliary client in an application group corresponding to a main client; sending a first presentation message to the first auxiliary client, the first presentation message is used to present a first interaction page on a first auxiliary device corresponding to the first auxiliary client; receiving a first operation result of the first auxiliary client on the first interaction page; sending a second presentation message to the main client, the second presentation message is used to present the first operation result on a main device corresponding to the main client; sending a third presentation message to the main client, the third presentation message is used to present a second interaction page on the main device; receiving a second operation result of the main client on the second interaction page.

20 Claims, 11 Drawing Sheets

(56) References Cited

U.S. PATENT DOCUMENTS

| | | | | |
|---|---|---|---|---|
| 9,636,572 | B2* | 5/2017 | Rubin | H04L 12/185 |
| 10,417,289 | B2* | 9/2019 | Imbruce | G06F 16/9535 |
| 2008/0229352 | A1* | 9/2008 | Pino | H04N 21/2543 |
| | | | | 348/E7.071 |
| 2017/0136346 | A1* | 5/2017 | Wang | G06F 3/011 |
| 2017/0193107 | A1* | 7/2017 | Imbruce | G06F 16/9535 |
| 2020/0329079 | A1* | 10/2020 | Yan | H04L 65/4015 |

FOREIGN PATENT DOCUMENTS

| | | | |
|---|---|---|---|
| CN | 104645614 A | | 5/2015 |
| CN | 108347653 A | | 7/2018 |
| CN | 108391155 A | * | 8/2018 |
| CN | 110446115 A | | 11/2019 |
| CN | 111870935 A | | 11/2020 |
| CN | 111950670 A | | 11/2020 |
| CN | 112717422 A | | 4/2021 |
| WO | 2017166517 A1 | | 10/2017 |

* cited by examiner

METHOD, APPARATUS AND DEVICE AND STORAGE MEDIUM FOR REAL-TIME INFORMATION INTERACTION

CROSS REFERENCE TO RELATED APPLICATIONS

This application is a national phase of International Patent Application No. PCT/CN2021/139615, filed on Dec. 20, 2021, which claims the priority to and benefits of Chinese Patent Application No. 202011616257.1 filed on Dec. 30, 2020. The entire disclosure of the aforementioned applications are incorporated by reference as part of the disclosure of this application.

TECHNICAL FIELD

Some embodiments of the present disclosure relate to a method, an apparatus, a device and a storage medium for real-time information interaction.

BACKGROUND

Online real-time interaction entertainment products perform real-time data transmission based on Internet network resources. A user can play a role of an anchor to chat with other users in an application group, play live games, answer questions and enjoy other entertainment products. However, at present, audience users in the application group can only participate in interaction in a form of textual comments, emoticons, etc., which cannot have an intuitive impact on the live broadcast process of the anchor. The interaction form is not intuitive and has a low level of participation, which makes this part of users unable to obtain a deep interaction experience at a game playing level.

SUMMARY

According to an aspect of the present disclosure, a method for real-time information interaction is provided. The method includes: determining a first auxiliary client in an application group corresponding to a main client; sending a first presentation message to the first auxiliary client, wherein the first presentation message is used to present a first interaction page on a first auxiliary device corresponding to the first auxiliary client; receiving a first operation result of the first auxiliary client on the first interaction page; sending a second presentation message to the main client, wherein the second presentation message is used to present the first operation result on a main device corresponding to the main client; sending a third presentation message to the main client, wherein the third presentation message is used to present a second interaction page on the main device; and receiving a second operation result of the main client on the second interaction page.

According to another aspect of the present disclosure, an apparatus for real-time information interaction is provided. The apparatus includes a processing unit configured to: determine a first auxiliary client in an application group corresponding to a main client; send a first presentation message to the first auxiliary client, wherein the first presentation message is used to present a first interaction page on a first auxiliary device corresponding to the first auxiliary client; receiving a first operation result of the first auxiliary client on the first interaction page; sending a second presentation message to the main client, wherein the second presentation message is used to present the first operation result on the main device corresponding to the main client; sending a third presentation message to the main client, wherein the third presentation message is used to present a second interaction page on the main device; and receiving a second operation result of the main client on the second interaction page.

According to yet another aspect of the present disclosure, a method for real-time information interaction is provided. The method includes: sending an interaction request from a main client; presenting, in response to the interaction request, a question text and a first operation result for the question text on a main display page of the main client, wherein the first operation result is obtained from a first auxiliary client in an application group corresponding to the main client; presenting a main interaction page, wherein the main interaction page includes a plurality of option controls corresponding to the question text; detecting a second operation result for the plurality of option controls on the first interaction page; and presenting a display content associated with the second operation result.

According to yet another aspect of the present disclosure, an apparatus for real-time information interaction is provided. The apparatus includes: a transmission unit configured to send an interaction request from a main client; a display unit configured to, present, in response to the interaction request, a question text and a first operation result for the question text on a main display page of the main client, wherein the first operation result is obtained from a first auxiliary client in an application group corresponding to the main client; present a main interaction page, wherein the main interaction page includes a plurality of option controls corresponding to the question text; a detection unit configured to detect a second operation result for the plurality of option controls on the first interaction page; and the display unit is further configured to present a display content associated with the second operation result.

According to yet another aspect of the present disclosure, a computer device is provided. The computer device includes: a processor, a memory, and a computer program stored on the memory, wherein the processor executes the computer program to implement steps of the method for real-time information interaction.

According to yet another aspect of the present disclosure, a non-transitory computer-readable storage medium is provided. A computer program is stored on the medium, and the computer program, upon execution by a processor, causes the processer to perform steps of the method for real-time information interaction.

BRIEF DESCRIPTION OF THE DRAWINGS

In order to illustrate the technical solutions of the embodiments of the present disclosure or of the related art more clearly, the following briefly introduces the accompanying drawings used in the description of the embodiments. Apparently, the accompanying drawings in the following description are only some embodiments of the present disclosure. For those of ordinary skill in the art, other drawings can also be obtained based on these drawings without creative work.

DETAILED DESCRIPTION

The technical solutions in the embodiments of the present disclosure will be clearly and completely described below with reference to the accompanying drawings. Apparently, the described embodiments are only some of the embodiments of the present disclosure, but not all of the embodiments. Based on the embodiments of the present disclosure, all other embodiments obtained by those of ordinary skill in the art without creative efforts also fall within the protection scope of the present disclosure.

As used in this disclosure, "first", "second" and similar terms do not denote any order, quantity, or importance, but are merely used to distinguish the various components. Likewise, a term such as "including" or "comprising" means that elements or things appearing before the term encompass elements or things recited after the term and their equivalents, but do not exclude other elements or things. A term such as "connected to" or "connected with" are not limited to physical or mechanical connections, but can include electrical connections, regardless directly or indirectly.

Figure 1:
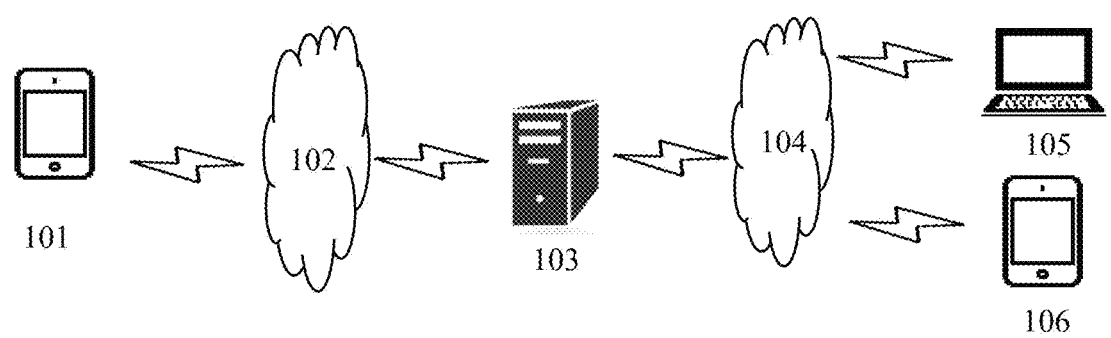
FIG. 1 illustrates a schematic diagram of a real-time interaction application scenario.

FIG. 1 illustrates a schematic diagram of a real-time interaction application system, including a terminal device (including a device 101, a fixed terminal 105 or a mobile terminal 106, etc.), a server 103, and networks 102 and 104.

The device 101 can interact with the server 103 over the network 102. The server 103 can also interact with the terminal device over the network 104 to forward real-time data to the terminal device. Here, the terminal device can be installed with various applications, such as web browser applications, search applications, video playback applications, news, information applications, and so on. In addition, the terminal device can also receive a user operation and generate a service request message based on the received operation instruction. Over the network 104, the terminal device can send the service request message to the server 103 and receive data returned by the server according to the service request message. The terminal device can display a screen presentation according to the data returned by the server. In addition, the server 103 can also directly send the presented data to the terminal device for screen presentation.

The terminal device can be either hardware or software. When the terminal device is hardware, it can be various electronic devices with display screens which can support operation of programs, including but not limited to smart phones, smart TVs, tablets, e-book readers, MP3 (Moving Picture Experts Group Audio Layer III) players MP4 (Moving Picture Experts Group AudioLayer IV) players, laptop computers, desktop computers, and so on. When the terminal device is software, it can be installed on the electronic device listed above, and it can be implemented as a plurality of software or software modules (such as software or software modules used to provide distributed services), or as a single software or software module, which is not specifically limited herein.

The server 103 can be a server providing various services, such as receiving and caching data streams sent by the devices 101, 105, 106, and the like. In addition, the server 103 can also receive a service request message sent by the terminal device, analyze the service request message, and send an analysis result (such as a data flow corresponding to the service request message) to the terminal device.

It can be understood that the number of terminal devices, networks and servers shown in FIG. 1 is only illustrative. Depending on actual application scenarios, there can be any number of terminal devices, networks and servers.

Specifically, in a process of a real-time interaction application, there are usually two types of participation roles: an anchor and an audience. The anchor is the leader of the interaction. For example, in an interaction scenario of question answering, the anchor can answer questions with other anchors in a form of live broadcast. In this case, the live broadcast room includes two participating roles: the anchor and the audience. The anchor can correspond to a user who participates in the question answering. Based on the answer result, the anchor can obtain a virtual reward and other achievements. The audience, corresponding to a user who does not participate in the question answering, who can passively watch the interaction process and participate in the interaction in the form of comments and emoticons.

However, for the audience, the existing interaction mode is too simple to have an intuitive impact on the live broadcast process of the anchor. The interaction form is not intuitive and has a low level of participation, which makes this part of users unable to obtain a deep interaction experience at a game playing level.

Some embodiments of the present disclosure provide a method and an apparatus, and a device for real-time information interaction and a storage medium, which can enable audience users to participate in interaction more directly through interaction pages by sending interaction pages to first auxiliary clients corresponding to the audience users.

Specifically, with the method for real-time information interaction provided according to some embodiments of the present disclosure, for example, the game server enables this part of users to deeply participate in real-time interaction by providing interaction pages to users corresponding to the audiences in a live broadcast room, for example.

The method and the apparatus, and the device for real-time information interaction storage medium provided by the embodiments of the present disclosure, by sending interaction pages to the clients in the application group, this part of users who receive interaction pages to operate based on the interaction pages, and feed the operation results on the pages back to the main client, thus making the user interaction form more intuitive and increasing the level of participation in the interaction, which is beneficial to providing users with an interaction product having a high level of participation.

Figure 2:
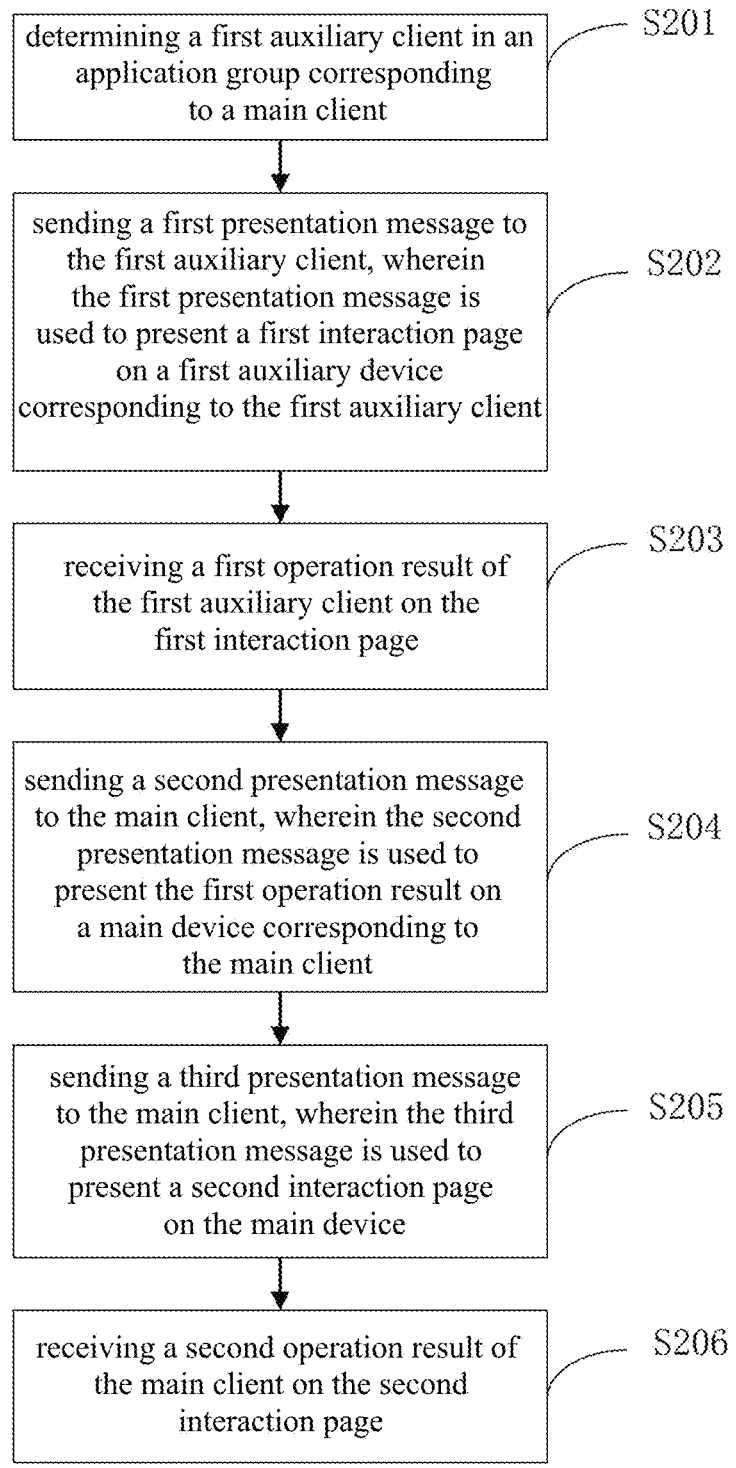
FIG. 2 illustrates a schematic flow chart of a method for real-time information interaction provided by the present disclosure.

FIG. 2 illustrates a schematic flow chart of a method for real-time information interaction provided by the present disclosure. The method for real-time information interaction includes steps S201-S206. For example, the server 103 shown in FIG. 1 can perform the steps to implement the method for real-time information interaction according to the present disclosure. By performing the above steps, the real-time interaction with devices such as 101, 105, 106, and so on. can be realized. Taking the devices 101, 105 and 106 as hardware devices for example, real-time interaction applications can be further installed on the devices.

First, in step S201, a first auxiliary client is determined in an application group corresponding to a main client. The application group can be a group built during real-time interaction. Taking video live broadcast as an example, the application group can correspond to a live broadcast room, which includes a main client corresponding to an anchor and auxiliary clients corresponding to audience users in the live broadcast room. For example, the main client can send an interaction request message to the server by operating the main device. Based on the received request message, the auxiliary clients in the current live broadcast room can be determined as the first auxiliary clients for interaction. It can be understood that the number of the first auxiliary clients determined can be one or more.

Then, in step S202, a first presentation message is sent to the first auxiliary client, wherein the first presentation message is used to present a first interaction page on a first auxiliary device corresponding to the first auxiliary client. The first auxiliary device corresponding to the first auxiliary client refers to a device on which the first auxiliary client logs in. The first presentation message can instruct the device to present the first interaction page. The interaction page can include an operation control and related operation information. The user can operate such operation control on the interaction page, such as clicking a button.

Then, as shown in FIG. 2, in step S203, a first operation result of the first auxiliary client on the first interaction page is received. The first operation result can correspond to an operation of the user on the presented first interaction page, such as an operation result of clicking a button. In step S204, a second presentation message is sent to the main client, wherein the second presentation message is used to present the first operation result on a main device corresponding to the main client. After receiving the first operation result from the first interaction page, the server can process data of the first operation result and send the processed data to the main client, so as to present a state of the first auxiliary client participating in the first interaction on the main device corresponding to the main client. The main device corresponding to the main client can refer to a device on which the anchor account logs in, and the first operation result can be based on the above processed data. For example, when there are a plurality of first auxiliary clients, the processed data can be statistical data of a plurality of first operation results.

As an example, when there are a plurality of first auxiliary clients, the server can send the first presentation message to each of the first auxiliary clients, and each of the first auxiliary clients will return the first operation result of the first interaction page to the server, and then, for example, the server can count the received a plurality of first operation results and send statistical data to the main client, so that the anchor can know the interaction states of the first auxiliary clients. As another example, when there is one first auxiliary client, the server can process the first operation result of the first auxiliary client and send the processing result to the main device, or the server can directly send the first operation result to the main device to present the interaction state of the first auxiliary client to the anchor. It can be understood that the second presentation message sent by the server to the main device is used to reflect the interaction state of the first auxiliary client participating in the first interaction page, which is related to the operation based on the first interaction page. Based on the interaction state, the anchor can respond accordingly, thus forming an interaction cycle between the anchor and the user.

Then, in step S205, a third presentation message is sent to the main client, wherein the third presentation message is used to present a second interaction page on the main device, and in step S206, a second operation result of the main client on the second interaction page is received.

According to some embodiments of the present disclosure, determining the first auxiliary client can include: determining the first auxiliary client based on attribute values of clients in the application group. As an example, a user participating in real-time interaction can have an attribute value that represents his user level. For example, a user can obtain the attribute value through a clock-in task, by sharing a link and other approaches. When determining the first auxiliary client, the server can directly determine one or more clients with the attribute value as the first auxiliary client.

According to some embodiments of the present disclosure, determining the first auxiliary client can include: determining, by the main client, the first auxiliary client, for example, by the main client selecting and instructing users whose user level exceeds a certain threshold to participate in interaction, that is, as the first auxiliary client.

Similarly, in a live broadcast application such as question answering, the anchor can also determine the first auxiliary client based on a question bank category of the question answering. For example, the server can store a plurality of question bank categories (such as common sense, geographical knowledge, humanistic knowledge, and so on), and each question bank category can correspond to information on a plurality of topics. As an example, in the live broadcast process, the anchor can instruct the question bank category of the current question answering to be life common sense, and the server will determine the first auxiliary client to participate in the question answering interaction based on the instruction of the category of life common sense. For example, in the interaction application scenario of live question answering, a user can select a category attribute he expects to participate in question answering, such as the category of life common sense, so that he has a label of this category. After the server determines that the current question bank category is common sense, the user can be determined as participating in interaction, that is, as the first auxiliary client.

The above has described an example method for determining the first auxiliary client. It can be understood that other methods can also be used to determine the first auxiliary client, such as random allocation, without limitation.

According to embodiments of the present disclosure, the first presentation message includes a first presentation instruction and a first presentation content. The first presentation instruction can be used to instruct the first auxiliary device to display the first interaction page on the main display page. Here, the first interaction page presented is above the main display page. That is, the presentation content on the first interaction page is not be obscured by the main display page. For example, the first interaction page can be implemented in a form of a pop-up window. Specifically, based on receiving the first presentation message, the first auxiliary device can present the first interaction page and present a question text as the first presentation content and a plurality of option controls on the first interaction page. Compared with the display content on the main display page, the interaction page also includes parts that can be operated, such as in a form of a trigger control. Through the interaction page, the user can carry out the corresponding operation content, and the operation result of the interaction page can also be fed back to the server. The interaction page can be understood as a specific operation window provided by the server for the user to interact.

Figure 3:
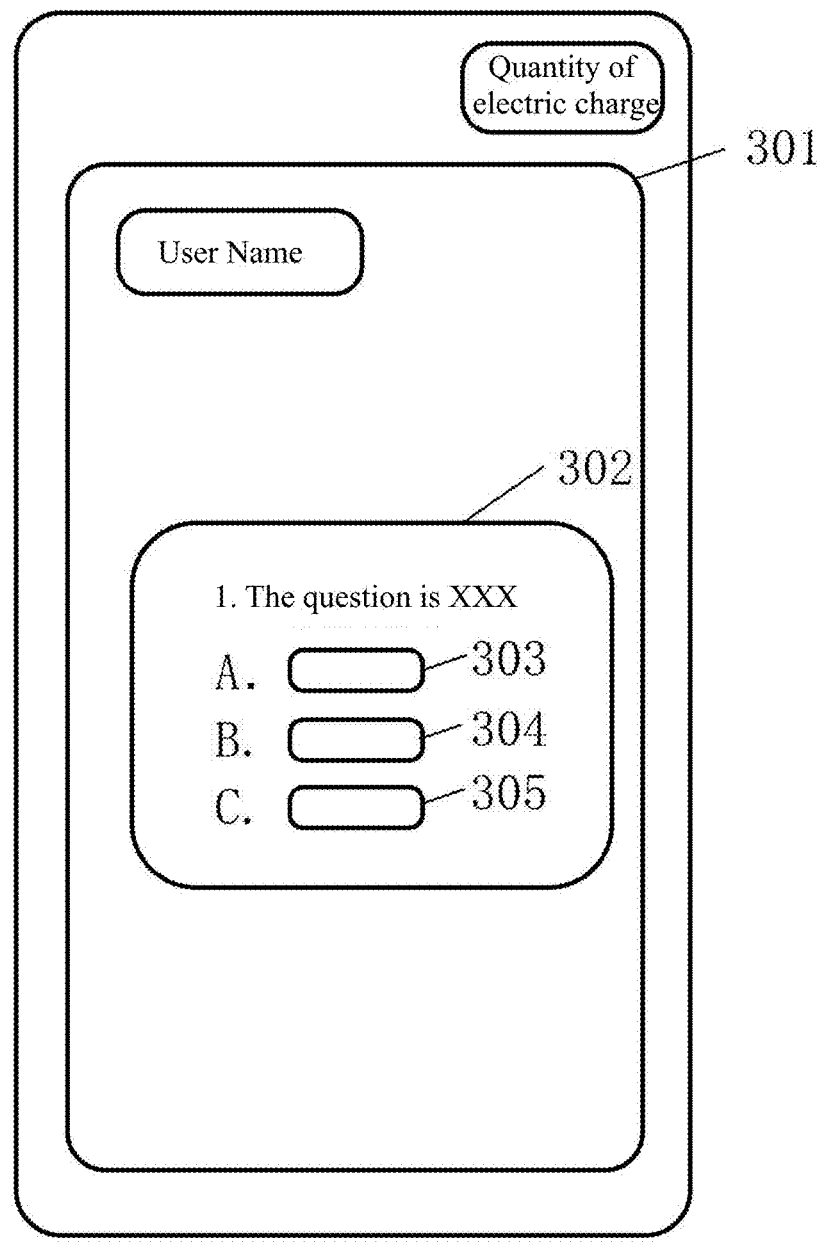
FIG. 3 illustrates a schematic diagram of a first auxiliary device presenting a first interaction page on a main display page according to embodiments of the present disclosure.

FIG. 3 illustrates a schematic diagram of a first auxiliary device presenting a first interaction page on a main display page according to embodiments of the present disclosure. The device shown in FIG. 3 can correspond to the first auxiliary device, including a main display page 301 and a first interaction page 302. As an example, the first interaction page completely covers the main display page. As other examples, the first interaction page can also cover only a part of the main display page, which is not limited herein. On the first interaction page 302, the question text "1. The question is XXX" is presented, and the option controls 303-305 are also presented.

According to embodiments of the present disclosure, the first operation result includes a triggering operation on one of the plurality of option controls on the first interaction page or receiving no triggering operation within a predetermined time period. For example, in FIG. 3, based on the option controls on the first interaction page, the user can conduct a triggering operation, such as clicking one of the three option controls as the first operation result. Otherwise, if the user does not perform any trigger operation within a predetermined time period (such as 10 seconds), it can also be returned to the server as the first operation result. The first presentation message also includes a presentation time instruction, which is used to instruct the first auxiliary device to cancel presenting the first interaction page after a predetermined time period (such as 10 seconds). After the presentation is canceled, the first auxiliary device presents the display content corresponding to the main display page.

It can be understood that in the illustrative effect in FIG. 3, the area of the first interaction page 302 is smaller than that of the main display page 301, and is located at the bottom of the main display page. However, in other example illustrative effects, the first interaction page 302 can also cover the entire main display page, that is, completely block the display content of the main display page, or the first interaction page can also be located at other positions of the main display page, which is not limited herein.

According to embodiments of the present disclosure, the second presentation message includes a second presentation instruction and a second presentation content. The second presentation instruction is used to instruct the main device to present the second presentation content on the main display page of the main device, and the second presentation content indicates the first operation result.

According to embodiments of the present disclosure, the application group includes a plurality of first auxiliary clients, the second presentation message is used to present, on the main device corresponding to the main client, a question text, a plurality of options for the question text, and a number of options selected by the first auxiliary clients for each option. That is, the above presentation content is taken as the second presentation content.

Figure 4:
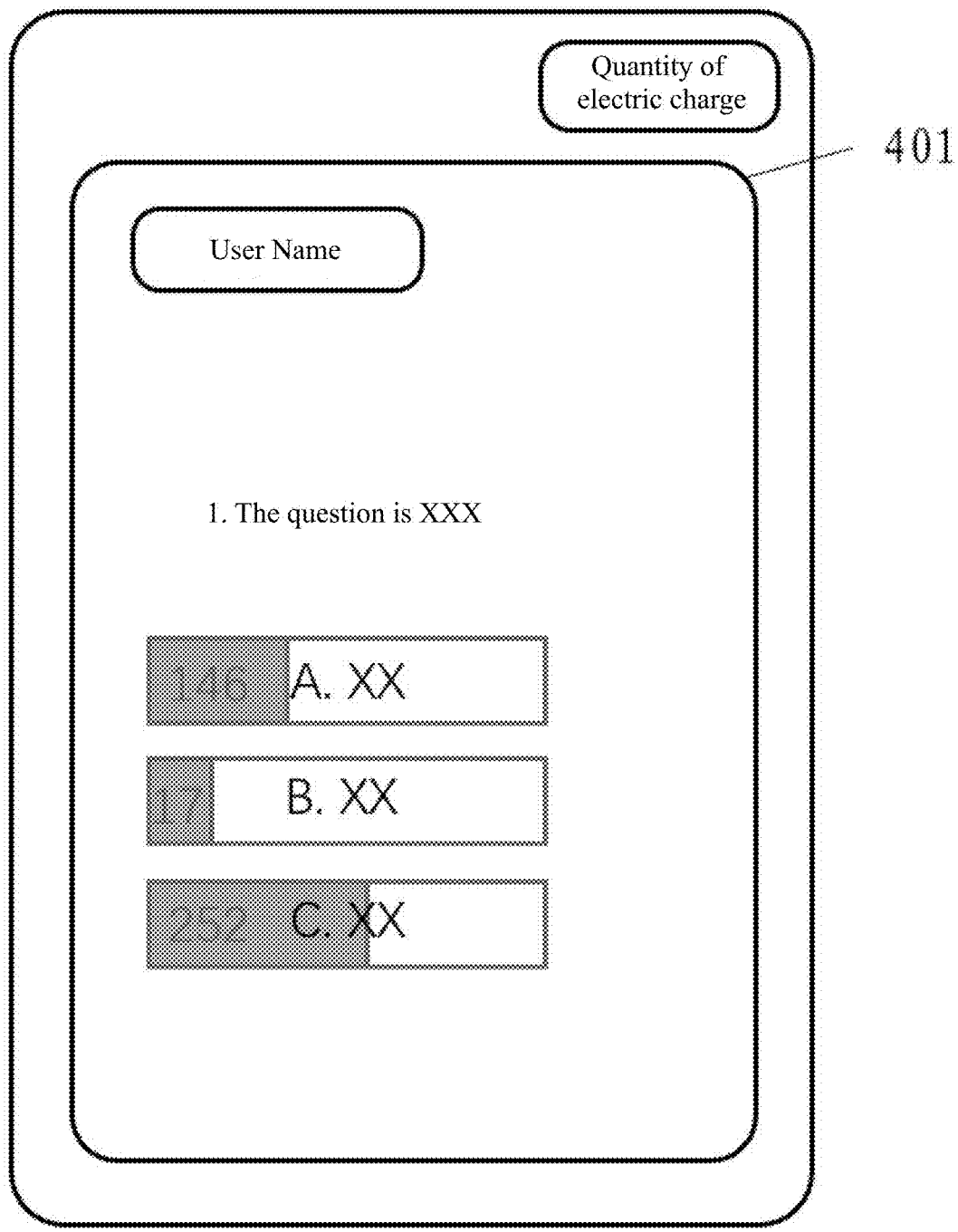
FIG. 4 illustrates a schematic diagram of first operation results.

FIG. 4 illustrates a schematic diagram of first operation results, showing a situation when a plurality of first operation results of a plurality of first auxiliary clients are presented on a main client. For example, statistics can be made on a plurality of first operation results of a plurality of first auxiliary clients. For example, 146 audiences have operated on option A, 17 audiences have operated on option B, and 252 audiences have operated on option C.

By presenting the first operation results shown in FIG. 4 on the main client, the anchor can visually check the option distribution of the audiences participating in question answering interaction in the live broadcast room, and perform subsequent operations based on the option distribution of the audiences. For example, on the second interaction page, a plurality of option keys presented can be operated on the second interaction page, as the final answer to the current question.

According to embodiments of the disclosure, the method also includes: sending a sixth presentation message to the first auxiliary client, wherein the sixth presentation message is used to present the first operation result on the first auxiliary device, wherein the sixth presentation message includes a sixth presentation instruction and a sixth presentation content. The sixth presentation instruction is used to instruct the first auxiliary device to present the sixth presentation content on the main display page of the first auxiliary device, and the sixth presentation content indicates the first operation result.

The method for presenting the first operation result on the first auxiliary client can be similar to the method for presenting the first operation result on the main client. For example, the main display page of the first auxiliary client can also present the content as described in FIG. 4. Based on this content, an audience user can directly understand the answering situation of the audiences in the live broadcast room, for example, how many people have chosen the same options as he himself.

It can be understood that the content reflecting the first operation results in FIG. 4 is only illustrative. The server can also perform any form of data processing, statistics, etc. on the received first operation results, and send the content reflecting the interaction state to the main device for presentation. Presentation contents and presentation effect in other forms are also possible, which is not limited herein.

According to some embodiments of the present disclosure, after presenting the first operation result to the main client, a third presentation message can also be sent to the main client. The third presentation message includes a third presentation instruction and a third presentation content. The third presentation instruction is used to instruct the main device to present the third presentation content on the second interaction page. The third presentation content includes a question text and a plurality of option controls, wherein the second operation result includes a triggering operation on one of a plurality of option controls on the second interaction page or receiving no triggering operation within a predetermined time period.

Similar to the description of the first auxiliary device, the server can also provide an interaction page to the main device by sending a third presentation message. In this step, the presentation effect of the second interaction page can be similar to the scenario shown in FIG. 3.

According to some embodiments of the present disclosure, sending the third presentation message to the main client includes: sending the third presentation message to the main client within a predetermined time period after sending the second presentation message. The predetermined time period can be 20 seconds or 1 minute, for example. For example, the server can present to the main device the first operation result of the first auxiliary client as an audience, as shown in FIG. 3, and set the presentation time to the predetermined time period, such as 1 minute. Within a predetermined time period, the anchor can check the first operation result and make decision on the final selection. For example, the anchor can take the option C with the largest number of choices as the final operation result, that is, trigger the option key corresponding to option C on the second interaction page.

According to other embodiments of the present disclosure, sending the third presentation message to the main client includes: sending the third presentation message to the main client after receiving a trigger instruction from the main client. For example, the user can make decision based on the first operation result presented, and after determining the decision, send a trigger instruction to the server, such as an answer request. After receiving the answer request, the server sends a third presentation message to the main device to present the second interaction page on the main device. The anchor can operate through the second interaction page as the second operation result and send the second operation result to the server.

In addition, the third presentation message can also include a presentation time instruction, which is used to instruct the main device to cancel presenting the second interaction page after the predetermined time period (such as 10 seconds). After the presentation is canceled, the main device presents the display content corresponding to the main display page. For example, the server can set a predetermined time period as the presentation time for presenting the second interaction page. The anchor operates on the interaction page during the presentation time, such as triggering the option control. If no operation is made during the presentation time, that is, interaction cannot be conducted through the interaction page, this will also be sent to the server as the second operation result. The operation result of no operation can indicate that the anchor does not answer this question.

According to some embodiments of the disclosure, the application group can include N first auxiliary clients, where N is larger than 1. That is, there are many audience users in the live broadcast room for question answering interaction, for example, N is equal to 415. The method can also include: based on the first operation result of each of the N first auxiliary clients, M first auxiliary clients are selected from the N first auxiliary clients as second auxiliary clients, where M is an integer smaller than N and larger than or equal to 1. Then, a fourth presentation message can be sent to the main client. The fourth presentation message includes a fourth presentation instruction and a fourth presentation content. The fourth presentation instruction is used to instruct the main device to present the fourth presentation content on the main display page. The fourth presentation content includes the identification of each of the selected M second auxiliary clients.

In this case, the audience users participating in the question answering (that is, the first auxiliary clients receiving the first interaction page) can be further graded. For example, an audience user whose first operation result is the correct option can be determined as the second auxiliary client based on the first operation result. Further, the identification of the second auxiliary client, such as an avatar, is presented on the display page of the main device.

In addition, when there are many users who answer the questions correctly, M second auxiliary clients can be determined based on the first operation results and timestamp of the first operation results. As an example, M equals 4. When receiving each first operation result, the first operation result also includes an operation time of the first operation result, such as a time interval between presenting the first interaction page and triggering the option key, such as 0.3 seconds. As an example, 252 of N=415 users have selected the correct option C. Then, when the server needs to determine 4 second auxiliary clients, the server can determine the 4 first auxiliary clients with the shortest operation time among the 252 selected users as the second auxiliary clients. It can be considered that the audiences of the four second auxiliary clients can not only answer questions accurately but also answer questions in a short time, that is, they can choose the correct choice accurately and quickly.

Figure 5A:
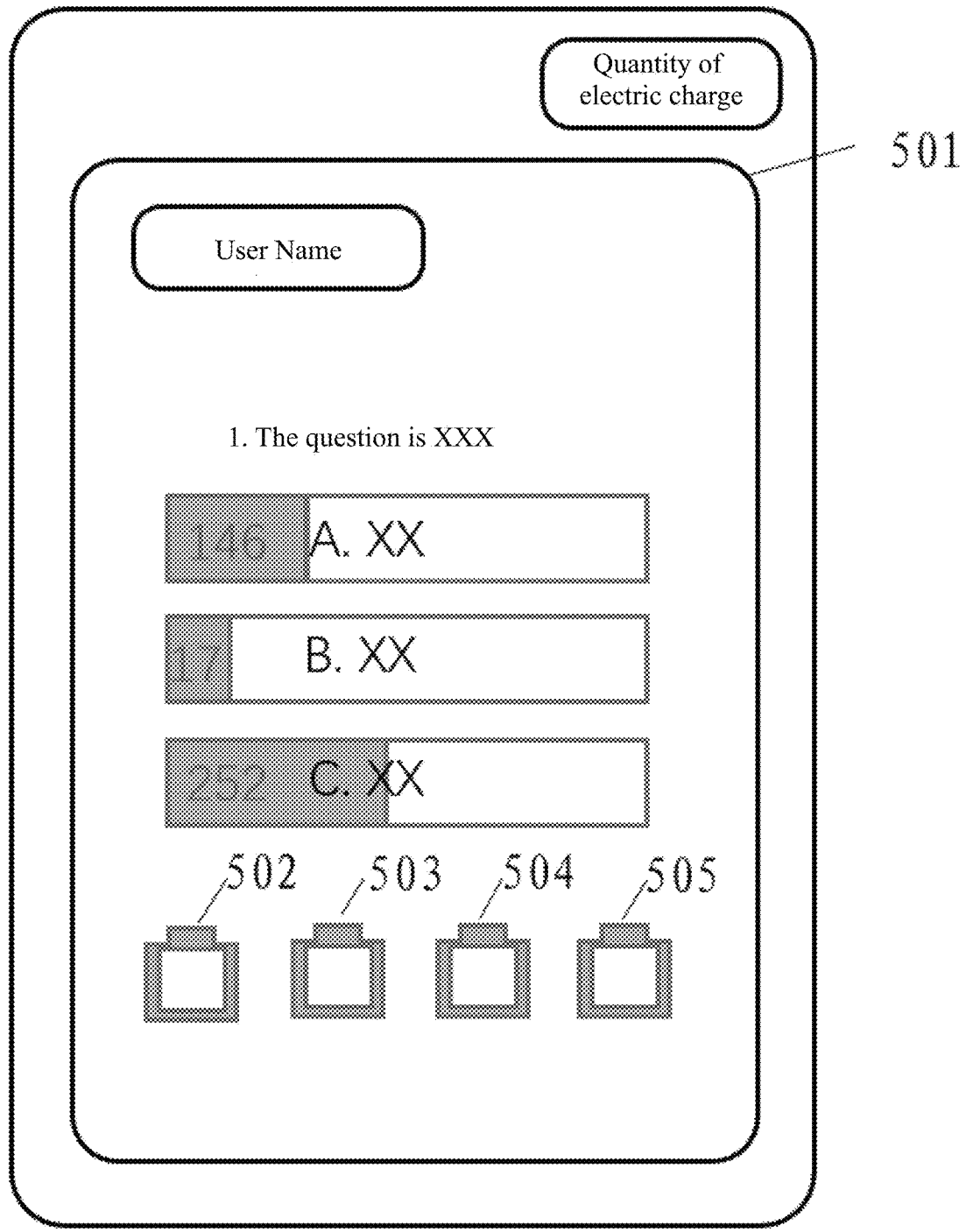
FIG. 5A illustrates a schematic diagram of presenting identifications of second auxiliary clients on the main display page.

According to embodiments of the present disclosure, after the second auxiliary client is determined, the identification of the determined second auxiliary client can be added on the home page of the user in the live broadcast room. FIG. 5A illustrates a schematic diagram of presenting identifications of second auxiliary clients on the main display page. Four second auxiliary clients 502-505 are presented on the main display page 501. As an example, the user's avatars and other information can be presented.

By presenting the content as shown in FIG. 5A, users in the live broadcast room can intuitively know which audiences have better answers to the displayed question, such as Question 1 shown in FIG. 3. For example, the answer is accurate and quick as described above. This can increase the confidence of the anchor in the answer results of this part of users, and can also increase the feeling of honor and pride in contribution to the game for this part of users. In addition, the server can also provide virtual rewards, such as virtual props, for this part of users after the question answering, as rewards for participating in interaction.

Figure 5B:
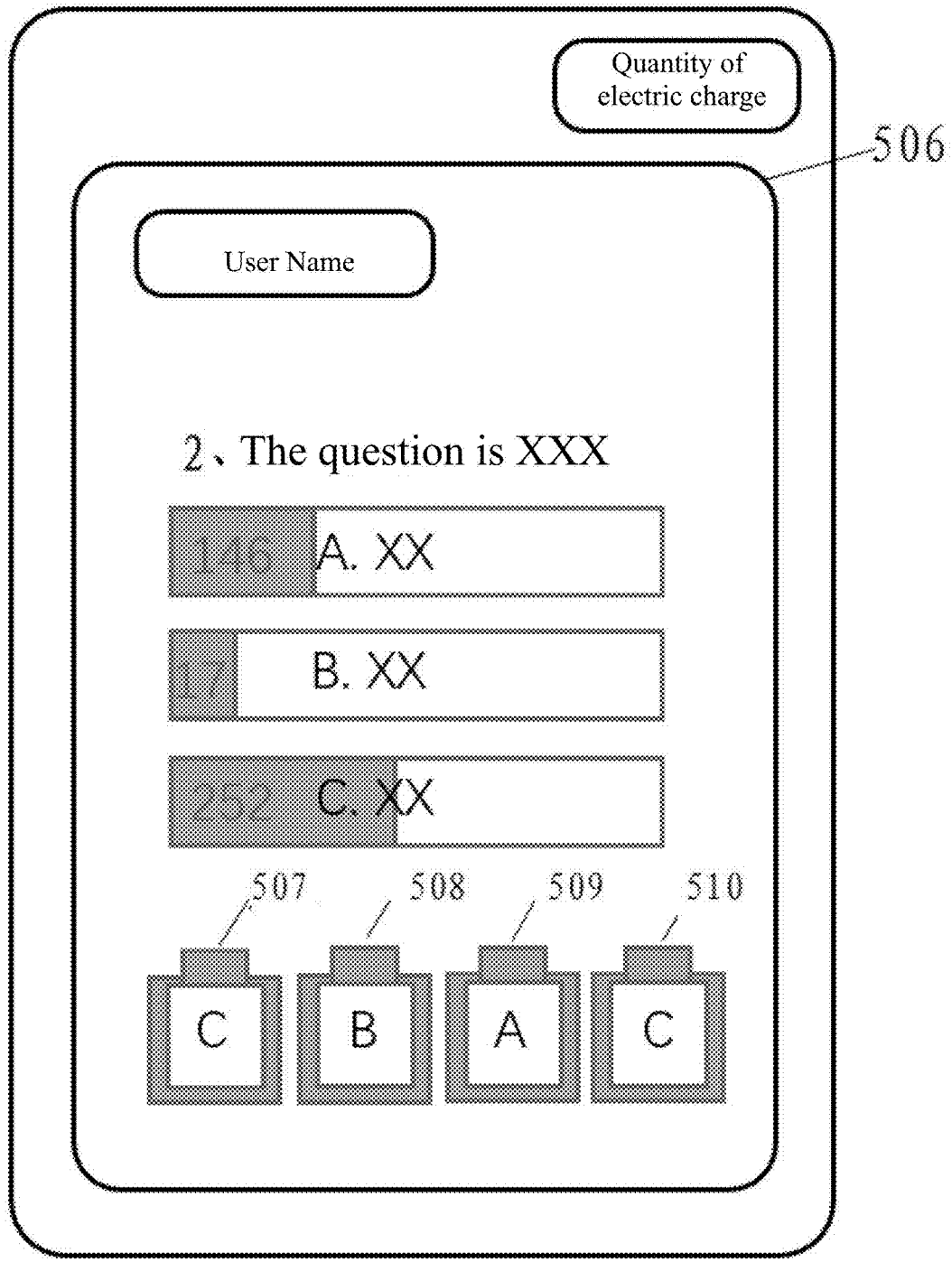
FIG. 5B illustrates a schematic diagram of presenting operation results of the second auxiliary clients on the main display page.

Further, according to other embodiments of the present disclosure, during the next round of question answering, the corresponding operation results of the determined second auxiliary clients (such as the four second auxiliary clients 502-505 shown in FIG. 5A) can be added to the main page. FIG. 5B illustrates a schematic diagram of presenting operation results of the second auxiliary clients on the main display page. For example, FIG. 5B can correspond to Question 2. On the main display page 506, it can not only present statistical data of a plurality of first operation results of a plurality of first auxiliary clients, but also can present the answer results of users identified as the second auxiliary clients in the last round of question answering, for example, 507-510 shown in FIG. 5B. Based on the content presented in FIG. 5B, the anchor can learn about the selection situation of users with desired results in the last round of question answering. The answer results of this part of users have higher reference value and can be used as reference information for selecting the final answer of the current Question 2.

According to some embodiments of the present disclosure, the above application group can also include a third auxiliary client. The third auxiliary client can be a client other than the first auxiliary clients and the main client in the application group. Such a third auxiliary client can correspond to an audience participating in the interaction who does not answer the question, and the interaction can correspond to comment interaction. In other words, the application group includes the main client corresponding to the anchor, which is used to lead the live broadcast interaction, the first auxiliary client corresponding to the audience for question answering interaction, and the third auxiliary client corresponding to the audience for comment interaction only.

According to other embodiments of the disclosure, the above method for real-time interaction can also include: sending a question answering result presentation message to the main client, the first auxiliary client and the third auxiliary client based on the received second operation result, and the presentation message includes a presentation instruction and a presentation content. The presentation content can include a display content of the correct answer for the question, for example, showing the correct option in hatched lines. Based on this display content, both the anchor and audiences of the live broadcast room can understand the correct option of the current question.

According to other embodiments of the disclosure, the above method for real-time interaction can also include: sending a fifth presentation message to the main client based on the received second operation result, wherein the fifth presentation message includes a fifth presentation instruction and a fifth presentation content, and the fifth presentation instruction is used to present a third interaction page on the main display page of the main device, and present the fifth presentation content on the third interaction page, wherein the fifth presentation content includes a display content corresponding to the second operation result.

Figure 6A:
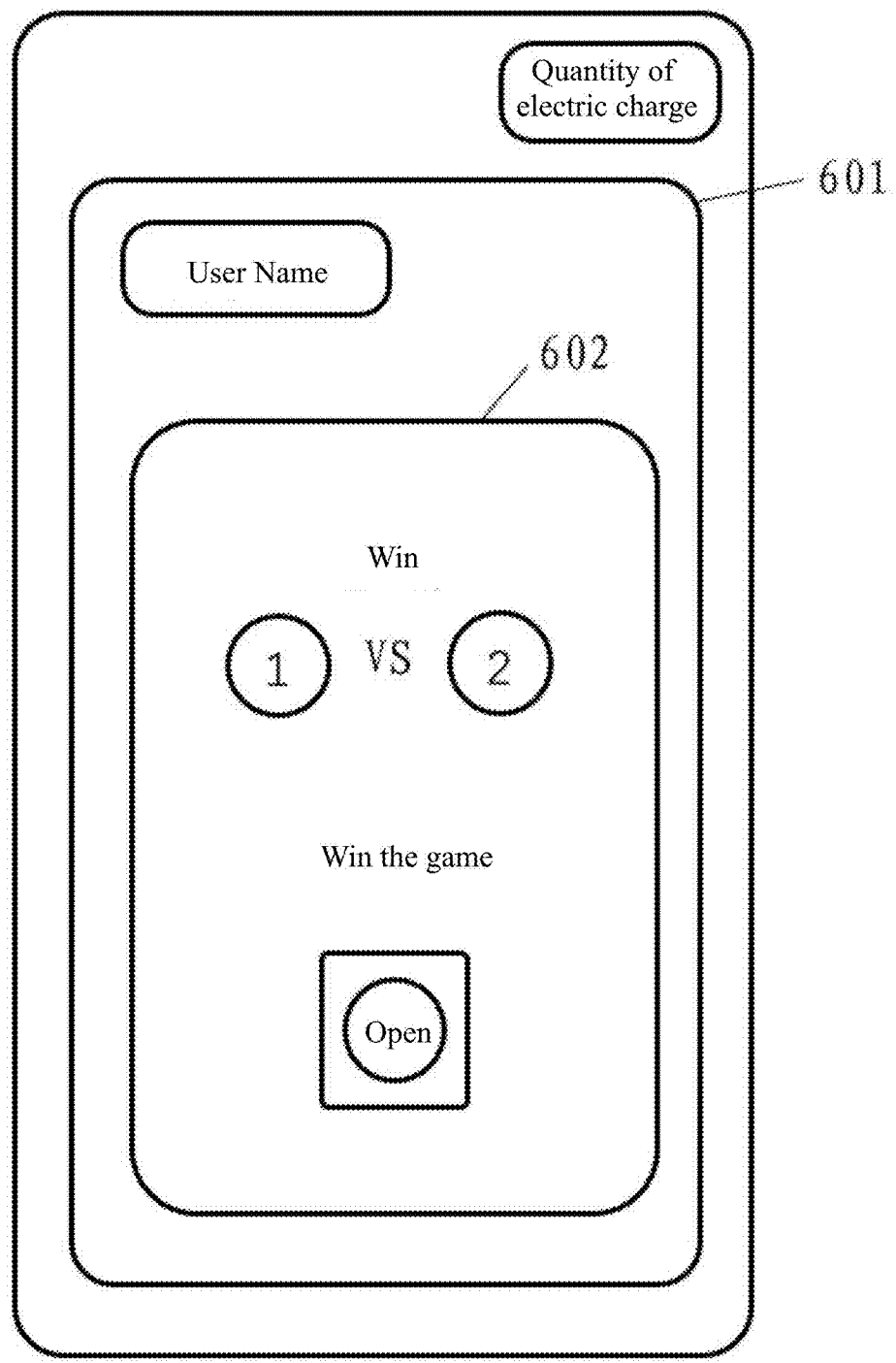
FIG. 6A illustrates a schematic diagram of a display content corresponding to the second operation result according to embodiments of the present disclosure.
Figure 6B:
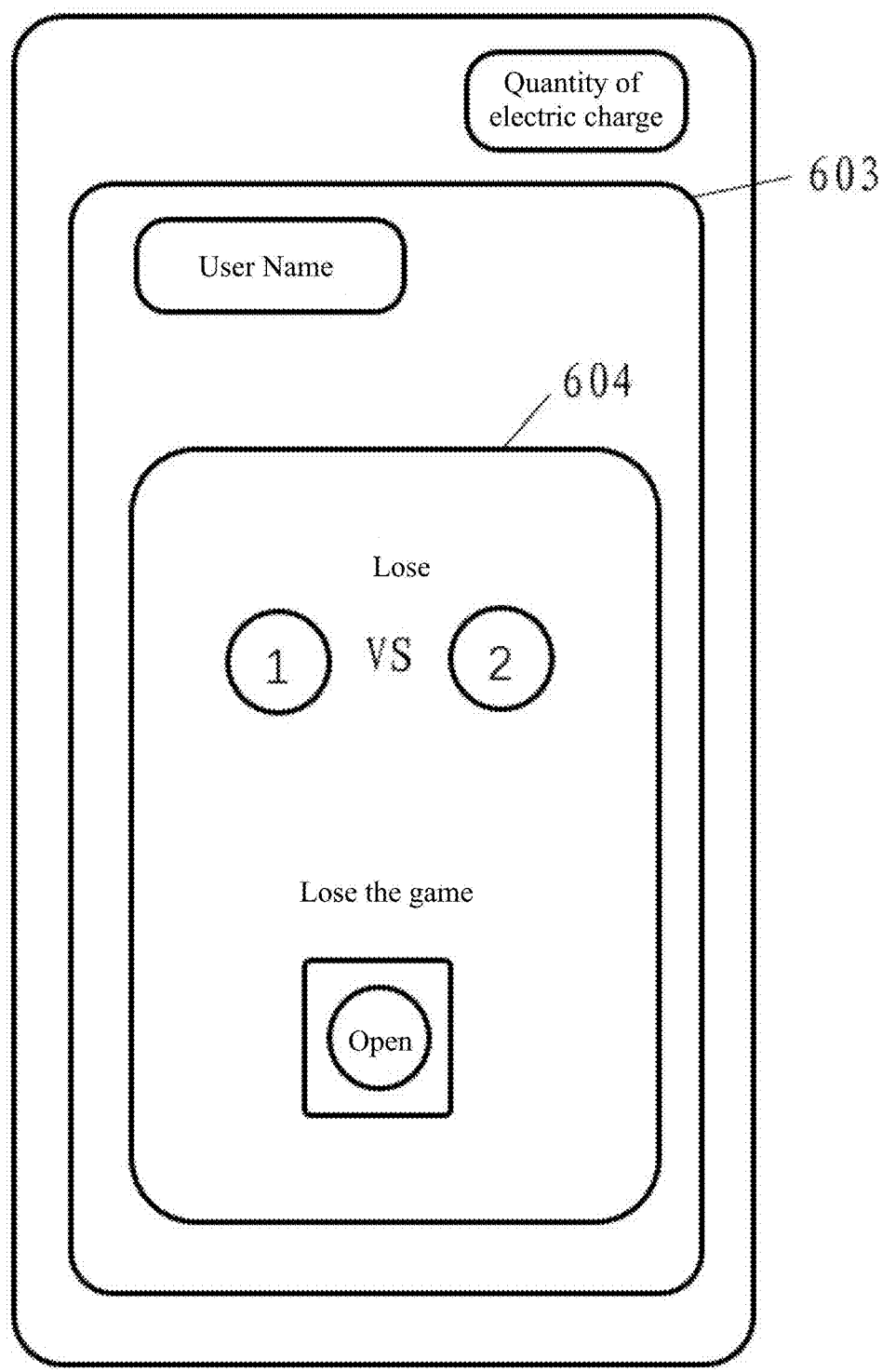
FIG. 6B illustrates another schematic diagram of a display content corresponding to the second operation result according to embodiments of the present disclosure.

As an example, FIG. 6A illustrates a schematic diagram of a display content corresponding to the second operation result according to embodiments of the present disclosure. In FIG. 6A, the main device includes a main display page 601 and a third interaction page 602. In the interaction page 602, the displayed content can include an effect diagram showing the result of this round of question answering, such as a winning sign. Furthermore, the displayed content can also include a virtual reward control that can be operated. As another example, FIG. 6B illustrates another schematic diagram of a display content corresponding to the second operation result according to embodiments of the present disclosure. Similarly, in FIG. 6B, the displayed content can include an effect diagram showing the result of this round of question answering, such as a losing sign. Furthermore, the displayed content can also include a virtual reward control that can be operated. Through the third interaction page, the main client can conduct further interaction operations, such as receiving rewards.

In the method for real-time information interaction provided according to embodiments of the present disclosure, by sending interaction pages to the clients in the application group, this part of users who receive interaction pages can operate based on the interaction pages, and feed the operation results on the pages back to the main client, thus making the user interaction form more intuitive and increasing the sense of participation in the interaction, which is beneficial to provide the user with an interaction product having a high level of participation.

Specifically, in the method according to embodiments of the disclosure, the users receiving the interaction pages include not only the main client corresponding to the anchor, but also the first client corresponding to the interaction audience participating in question answering, so that the audience user receiving the interaction page can also participate in the activity through the interaction page, and his operation result can also affect the interaction process, interaction state, operation result, and so on of the anchor, which can improve user experience in the interaction and participation for audiences.

Figure 6C:
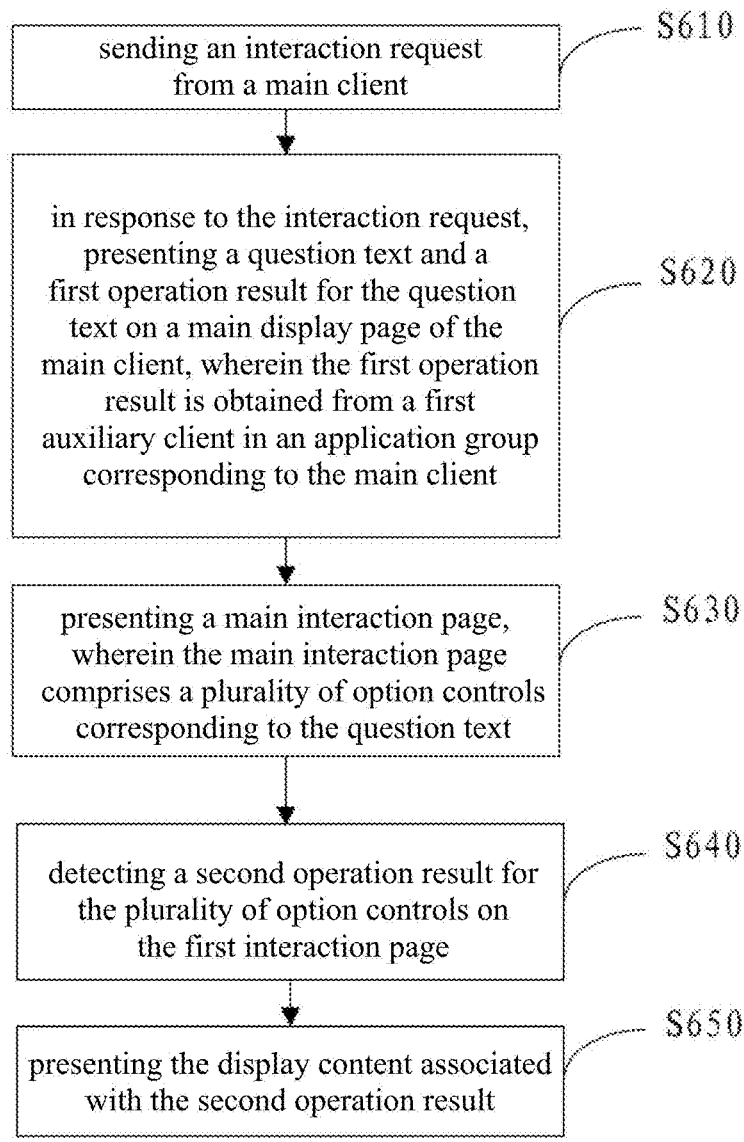
FIG. 6C illustrates a schematic flow chart of another method for real-time information interaction provided by the present disclosure.

According to another aspect of the disclosure, a method for real-time information interaction is also provided, as shown in FIG. 6C, which includes the following steps. In S610, an interaction request from a main client is sent. In S620, in response to the interaction request, a question text is presented and a first operation result for the question text on a main display page of the main client, wherein the first operation result is obtained from a first auxiliary client in an application group corresponding to the main client. In S630, a main interaction page is presented, wherein the main interaction page includes a plurality of option controls corresponding to the question text. In S640, a second operation result for the plurality option controls on the first interaction page is detected. In S650, a display content associated with the second operation result is presented.

An application scenario for implementing the method provided according to the present disclosure will be described in detail below to better understand the method for real-time interaction according to the present disclosure. In this application scenario, a question answering contest between anchors of two live broadcast rooms is taken as a specific example. It should be noted that the method disclosed in the present disclosure is not limited to this scenario.

Taking one live broadcast room (e.g., a live broadcast room A) of two live broadcast rooms (e.g., a live broadcast room A and a live broadcast room B) as an example to describe, and the operation process of another live broadcast room is similar. The live broadcast room A corresponds to Anchor A, and the live broadcast room B corresponds to Anchor B. First, Anchor A can send a request to the server to start the game. After receiving the request, the server can determine audience users currently included in the live broadcast room as first auxiliary clients (which can be referred to as question answering audiences), which are used to receive interaction pages and participate in the question answering interaction through the interaction pages. For example, there can be 415 question answering audiences. Audiences who enter the live broadcast room A after the question answering will no longer be determined as second auxiliary clients, that is, they cannot receive the interaction page to participate in the interaction, and this part of audiences are regarded as non-question-answering audiences.

Next, a first question answering process can be performed, and an interaction page can be sent to each question-answering audience. The interaction page includes question 1, and operable keys for question 1, such as options A, B, and C shown in FIG. 3. This part of audiences can participate in the question answering process through the interaction page, that is, to make choices. In addition, the display time can be set for the interaction page, for example, 10 seconds. The audiences need to operate within 10 seconds, otherwise the interaction page can be canceled, that is, an operation result of no operation will be generated.

The question-answering audiences send the operation results to the server, and the server can process the received 415 operation results, such as counting the number of selections for each option, and sending the processing results to the anchor, for example, by presenting the processed data on the display page of the main client, such as the content shown in FIG. 4. The anchor can make decision according to the presented content. Then, the server can send an interaction page to the anchor so that the anchor can perform question answering operation and send the operation result to the server.

Based on the operation result of the anchor, the server can determine whether the result of the anchor is correct, and present the display content accordingly, such as displaying the correct option and the selection result of the anchor.

On the basis of this round of question answering, the server can further determine a part of superior question-answering audiences among 415 question-answering audiences, as the second auxiliary clients, for example, as described above, determining four superior question-answering audiences based on the answer results and answer times, and presenting the identification of this part of the audiences on the main display page.

In the next round of question, namely, Question 2, the operation process of the first auxiliary client is similar to that of question 1, that is, the first auxiliary clients select based on the interaction page, and send the selection results to the server. The server performs statistics on the selection results and sends the result to the display page of the anchor. In addition, for the superior question-answering audiences determined for the previous question, the selection results can be more intuitively displayed on the main display page, as shown in 507-510 in FIG. 5B. Referring to the display content in FIG. 5B, the anchor makes decision on this round of question answering.

After a plurality of rounds of question answering, such as answering 10 questions, the server will determine a winner based on the answer results of Anchor A and Anchor B, and display the results shown in FIG. 6A or FIG. 6B accordingly.

In the method according to the present disclosure, the audiences are more directly involved in the interaction by sending interaction pages to the audiences, so that the audiences in the live broadcast room and the anchor can interact with each other as a whole team, which can improve the participation level for the users and enrich the participation form of the entertainment product.

Figure 7A:
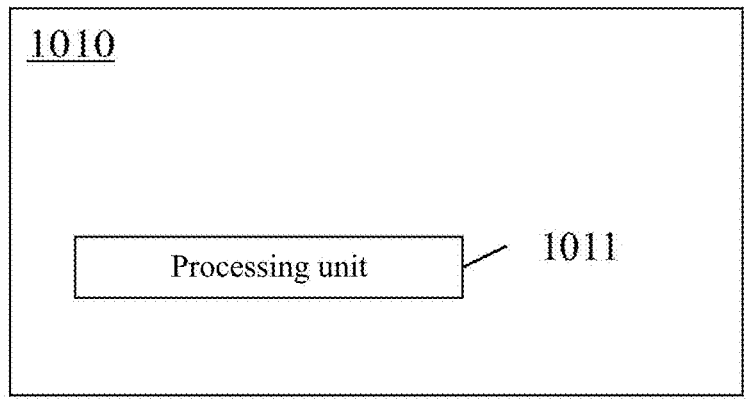
FIG. 7A illustrates a schematic block diagram of an apparatus for real-time information interaction provided by the present disclosure.

According to another aspect of the present disclosure, an apparatus for real-time information interaction is also provided. FIG. 7A illustrates a schematic block diagram of an apparatus for real-time information interaction provided by the present disclosure. As shown in FIG. 7A, an apparatus 1010 for real-time information interaction can include a processing unit 1011.

According to embodiments of the present disclosure, in at least one example, the processing unit 1011 can be configured to perform the following steps: determining a first auxiliary client in an application group corresponding to the main client; sending a first presentation message to the first auxiliary client, wherein the first presentation message is used to present a first interaction page on the first auxiliary device corresponding to the first auxiliary client; receiving a first operation result of the first auxiliary client on the first interaction page; sending a second presentation message to the main client, wherein the second presentation message is used to present the first operation result on a main device corresponding to the main client; sending a third presentation message to the main client, wherein the third presentation message is used to present a second interaction page on the main device; and receiving a second operation result of the main client on the second interaction page. For example, the apparatus 1010 can correspond to the server 103 shown in FIG. 1. Similarly, the apparatus 1010 can perform the method for real-time interaction described with reference to FIG. 2 according to the present disclosure, which will not be described in detail.

Figure 7B:
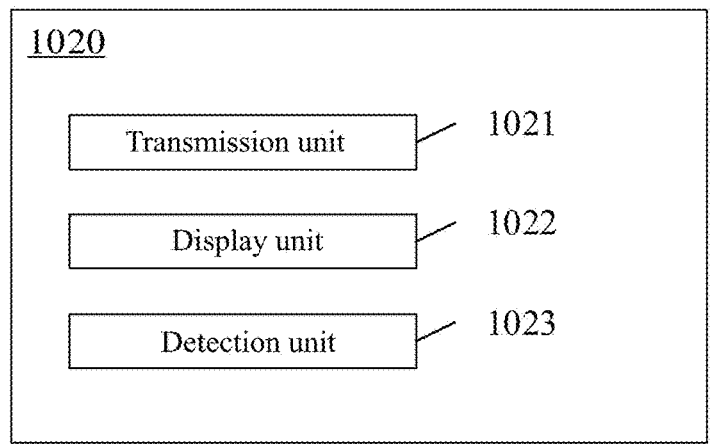
FIG. 7B illustrates a schematic block diagram of an apparatus for real-time information interaction provided by the present disclosure.

According to another aspect of the present disclosure, an apparatus for real-time information interaction is also provided. FIG. 7B illustrates a schematic block diagram of an apparatus for real-time information interaction provided by the present disclosure. As shown in FIG. 7B, an apparatus 1020 for real-time information interaction can include a transmission unit 1021, a display unit 1022, and a detection unit 1023. According to embodiments of the present disclosure, the transmission unit 1021 can be configured to send an interaction request from a main client. The display unit 1022 is configured to, in response to the interaction request, present a question text and a first operation result for the question text on a main display page of the main client, wherein the first operation result is obtained from a first auxiliary client in an application group corresponding to the main client; present a main interaction page, wherein the main interaction page includes a plurality of option controls corresponding to the question text. The detection unit 1023 is configured to detect a second operation result for the plurality of option controls on the first interaction page. In addition, the display unit 1022 can be further configured to present a display content associated with the second operation result.

For example, the apparatus 1020 can correspond to the terminal device shown in FIG. 1 that interacts with the server, and the terminal device corresponds to the anchor account, that is, corresponds to the anchor client. Similarly, the apparatus 1020 can perform the method for real-time interaction described with reference to FIG. 6C according to the present disclosure, which will not be described in detail.

Figure 8:
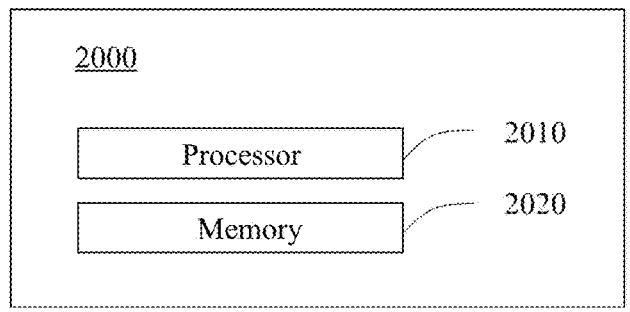
FIG. 8 illustrates a schematic block diagram of a computer device provided by the present disclosure.

According to another aspect of the present disclosure, there is also provided a computer device, and FIG. 8 illustrates a schematic block diagram of a computer device provided by the present disclosure.

As shown in FIG. 8, a computer device 2000 can include a processor 2010 and a memory 2020, where a computer program (such as program instructions, code, etc.) is stored on the memory 2020. The processor 2020 can perform the computer program to implement the steps of the method for real-time information interaction described above. For example, the computer device 2000 can correspond to the above game operator server.

In at least one example, the processor 2010 can perform various actions and processes according to computer programs stored in the memory 2020. For example, the processor 2010 can be an integrated circuit chip with signal processing capability. The above processor can be a general-purpose processor, a digital signal processor (DSP), an application specific integrated circuit (ASIC), an off-the-shelf programmable gate array (FPGA) or other programmable logic devices, or transistor logic devices, discrete hardware components. Various methods, steps and logic diagrams disclosed in the embodiments of the present disclosure can be implemented or performed. The general processor can be a microprocessor or any conventional processor, which can be X86 architecture or ARM architecture.

A computer executable computer program is stored in the memory 2020, which can implement the method for real-time information interaction provided according to the embodiments of the present disclosure when executed by the processor 2010. The memory 2020 can be a volatile memory or a non-volatile memory, or can include both a volatile and a non-volatile memory. The non-volatile memory can be a read only memory (ROM), a programmable read only memory (PROM), an erasable programmable read only memory (EPROM), an electrically erasable programmable read only memory (EEPROM) or a flash memory. The volatile memory can be a random-access memory (RAM), which is used as an external cache. By way of illustration but not limitation, many forms of RAM are available, such as a static random-access memory (SRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a synchronous connection of dynamic random-access memory (SLDRAM) and a direct memory bus random access memory (DR RAM). It should be noted that the memory of the methods described herein is intended to include, but not limited to, these and any other suitable types of memory.

According to other embodiments of the present disclosure, the computer device 2000 can also include a display (not shown) to enable visualization of, for example, a computer operator. For example, the operation information, data processing, etc. in the process of implementing the above method for real-time information interaction can be displayed on the display, or the computer program can also be displayed without limitation. In addition, the computer device 2000 can also include necessary components such as an interaction interface, an input device, a communication unit, etc., which are used to implement information interaction between the computer, an operator, and other devices. For example, the operator can modify the computer program through the input device.

Figure 9:
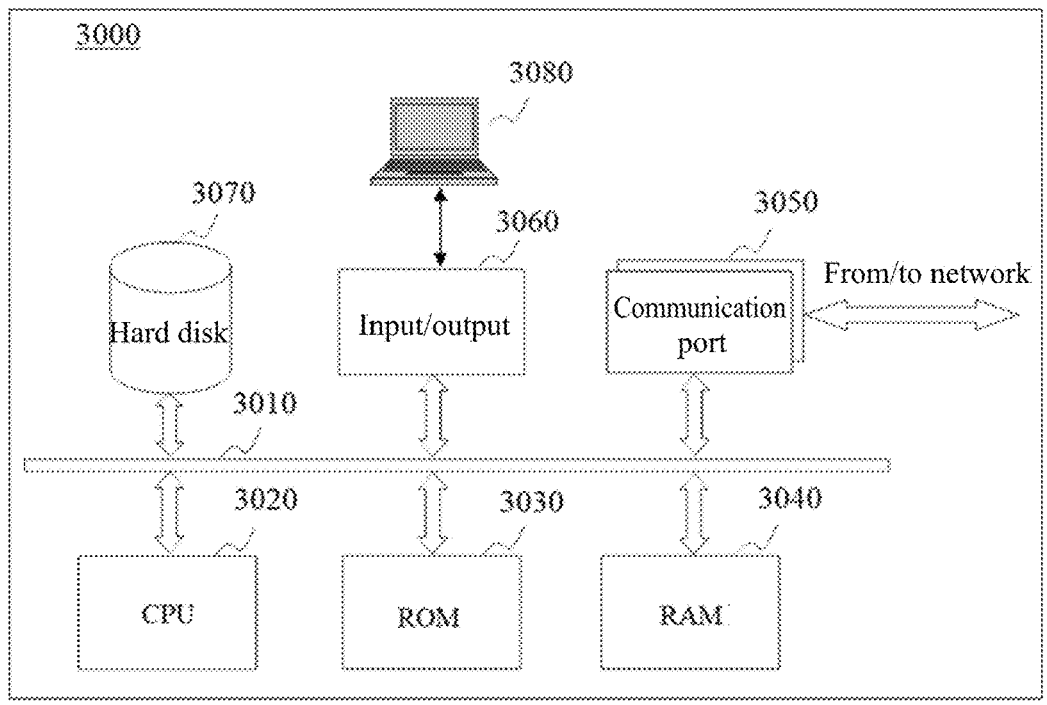
FIG. 9 illustrates a schematic block diagram of an exemplary computing device according to an embodiment of the present disclosure.

As an exemplary embodiment, the apparatus 1000 or the computer device 2000 according to the present disclosure can be implemented as a computing device as shown in FIG. 9.

FIG. 9 illustrates a schematic block diagram of an exemplary computing device according to an embodiment of the present disclosure. The computing device 3000 can include a bus 3010, one or more CPUs 3020, a read-only memory (ROM) 3030, a random-access memory (RAM) 3040, a communication port 3050 connected to a network, an input/output component 3060, a hard disk 3070, and the like. The storage device in the computing device 3000, such as a ROM 3030 or a hard disk 3070, can store various data or files involved in the processing and/or communication of the method for real-time information interaction provided in the present disclosure, as well as computer programs executed by the CPU. The computing device 3000 can also include a user interface 3080. However, the architecture shown in FIG. 9 is only illustrative. When implementing different devices, one or more components of the computing devices shown in FIG. 9 can be omitted according to actual needs, or the required components can be added to the computing devices shown in FIG. 9, which is not limited herein.

Figure 10:
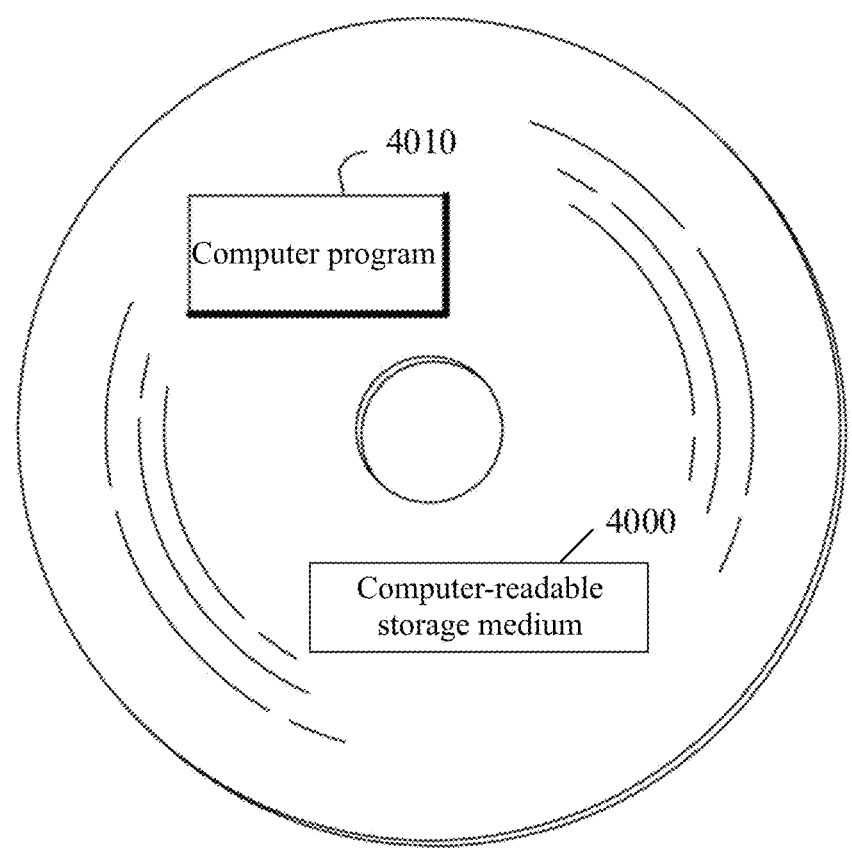
FIG. 10 illustrates a schematic block diagram of a computer-readable storage medium provided by the present disclosure.

According to another aspect of the present disclosure, there is also provided a computer-readable storage medium, and FIG. 10 illustrates a schematic block diagram of a computer-readable storage medium provided by the present disclosure.

As shown in FIG. 10, a computer program 4010 is stored on the computer-readable storage medium 4000, wherein the computer program 4010 implements the steps of the method for real-time information interaction described above when executed by the processor. In at least one example, the computer-readable storage medium 4000 includes, but is not limited to, a volatile memory and/or a non-volatile memory. The volatile memory can include, for example, a random-access memory (RAM) and/or a cache memory. The non-volatile memory can include, for example, a read-only memory (ROM), a hard disk, a flash memory, and the like. For example, the computer-readable storage medium 4000 can be connected to a computing device such as a computer (e. g., as shown in FIG. 9). Then, when the computing device runs the computer program 4010 stored on the computer-readable storage medium 4000, the method for real-time information interaction provided by the present disclosure can be performed.

According to another aspect of the present disclosure, there is also provided a computer program product, including a computer program. In at least one example, when the computer program is executed by a processor, steps of the method for real-time information interaction described above are implemented.

Those skilled in the art can understand that the content disclosed in the present disclosure may be subject to various variations and improvements. For example, various devices or components described above can be implemented by hardware, software, firmware, or some or all of the three.

In addition, although the present disclosure makes various references to some units in the system according to the embodiments of the present disclosure, any number of different units can be used and run on the client and/or server. The units are merely illustrative, and different units may be used for different aspects of systems and methods.

A flowchart is used in the present disclosure to illustrate steps of the method according to embodiments of the present disclosure. It should be understood that the previous or subsequent steps are not necessarily carried out in a precise order. Instead, the various steps can be processed in reverse order or simultaneously. Other operations can also be added to these procedures.

Those skilled in the art can understand that all or part of the steps in the above method can be completed by instructing related hardware through a computer program, and the program can be stored in a computer-readable storage medium, such as a read-only memory, a disk, or an optical disk. Alternatively, all or part of the steps of the above embodiments may also be implemented using one or more integrated circuits. Accordingly, each module/unit in the above embodiments can be implemented in the form of hardware or software functional modules. The present disclosure is not limited to the combination of any specific form of hardware and software.

Unless otherwise defined, all terms used herein have the same meaning as that commonly understood by those skilled in the art to which this disclosure belongs. It should also be understood that terms such as those defined in the general dictionary should be interpreted as having meanings consistent with their meanings in the context of relevant technologies, and should not be interpreted in an idealized or highly formalized sense, unless explicitly defined here.

The above is merely a description of the present disclosure and should not be considered as a limitation. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be included in the scope of the disclosure as defined in the claims. It should be understood that the above is a description of the present disclosure, which should not be considered as limited to the specific embodiments disclosed, and the intention to modify the disclosed embodiments and other embodiments is included in the scope of the appended claims. The present disclosure is limited by the appended claims.

What is claimed is:

1. A method for real-time information interaction, comprising:
   determining a first auxiliary client in an application group corresponding to a main client, wherein the main client corresponds to a client of an anchor of a question and answer interaction and the first auxiliary client corresponds to a client of an audience user participating in the question and answer interaction;
   sending a first presentation message to the first auxiliary client, wherein the first presentation message is used to present a first interaction page on a first auxiliary device corresponding to the first auxiliary client;
   receiving a first operation result of the first auxiliary client on the first interaction page;
   sending a second presentation message to the main client, wherein the second presentation message is used to present the first operation result on a main device corresponding to the main client;
   sending a third presentation message to the main client, wherein the third presentation message is used to present a second interaction page on the main device; and
   receiving a second operation result of the main client on the second interaction page.

2. The method according to claim 1, wherein the first presentation message comprises a first presentation instruction and a first presentation content, the first presentation instruction is used to instruct the first auxiliary device to present the first presentation content on the first interaction page, and the first presentation content comprises a question text and a plurality of option controls.

3. The method according to claim 2, wherein the first operation result comprises a triggering operation on one of the plurality of option controls on the first interaction page or receiving no triggering operation on the plurality of option controls within a predetermined time period.

4. The method according to claim 1, wherein the second presentation message comprises a second presentation instruction and a second presentation content, the second presentation instruction is used to instruct the main device to present the second presentation content on a main display page of the main device, and the second presentation content indicates the first operation result.

5. The method according to claim 1, wherein the third presentation message comprises a third presentation instruction and a third presentation content, the third presentation instruction is used to instruct the main device to present the third presentation content on the second interaction page, and the third presentation content comprises a question text and a plurality of option controls,
   wherein the second operation result comprises a triggering operation on one of the plurality of option controls on the second interaction page or receiving no triggering operation on the plurality of option controls within a predetermined time period.

6. The method according to claim 1, wherein the application group comprises a plurality of first auxiliary clients, the second presentation message is used to present, on the main device corresponding to the main client, a question text, a plurality of options for the question text, and a number of selections for each option selected by the plurality of first auxiliary clients.

7. The method according to claim 1, wherein the application group comprises N first auxiliary clients, where N is larger than 1, and the method further comprises:
   selecting, based on the first operation result of each of the N first auxiliary clients, M first auxiliary clients as second auxiliary clients from the N first auxiliary clients, where M is an integer smaller than N and larger than or equal to 1.

8. The method according to claim 7, further comprising:
   sending a fourth presentation message to the main client, wherein the fourth presentation message comprises a fourth presentation instruction and a fourth presentation content, the fourth presentation instruction is used to instruct the main device to present the fourth presentation content on a main display page, and the fourth presentation content comprises an identification of each of the selected M second auxiliary clients.

9. The method according to claim 1, wherein sending the third presentation message to the main client comprises:
   sending the third presentation message to the main client within a predetermined time interval after sending the second presentation message; or
   sending the third presentation message to the main client after receiving a trigger instruction from the main client.

10. The method according to claim 1, further comprising:
    sending, based on the received second operation result, a fifth presentation message to the main client, wherein the fifth presentation message comprises a fifth presentation instruction and a fifth presentation content, the fifth presentation instruction is used to present a third interaction page on a main display page of the main device, and present the fifth presentation content on the third interaction page, the fifth presentation content comprises a display content corresponding to the second operation result.

11. The method according to claim 1, further comprising:
    sending a sixth presentation message to the first auxiliary client, wherein the sixth presentation message is used to present the first operation result on the first auxiliary device, wherein the sixth presentation message comprises a sixth presentation instruction and a sixth presentation content, and the sixth presentation instruction is used to instruct the first auxiliary device to present the sixth presentation content on a main display page of the first auxiliary device, the sixth presentation content indicates the first operation result.

12. The method according to claim 2, wherein the first presentation message further comprises a presentation time instruction for instructing the first auxiliary device to cancel presenting the first interaction page after a predetermined time period.

13. A computer device, comprising a processor, a memory, and a computer program stored on the memory, wherein the processor executes the computer program to implement steps of the method for real-time information interaction according to claim 1.

14. A non-transitory computer-readable storage medium, wherein a computer program is stored thereon, the computer program, upon execution by a processor, causes the processor to perform steps of the method for real-time information interaction according to claim 1.

15. An apparatus for real-time information interaction, wherein the apparatus comprises a processing unit configured to:
    determine a first auxiliary client in an application group corresponding to a main client, wherein the main client corresponds to a client of an anchor of a question and answer interaction and the first auxiliary client corresponds to a client of an audience user participating in the question and answer interaction;

send a first presentation message to the first auxiliary client, wherein the first presentation message is used to present a first interaction page on a first auxiliary device corresponding to the first auxiliary client;

receiving a first operation result of the first auxiliary client on the first interaction page;

sending a second presentation message to the main client, wherein the second presentation message is used to present the first operation result on the main device corresponding to the main client;

sending a third presentation message to the main client, wherein the third presentation message is used to present a second interaction page on the main device; and receiving a second operation result of the main client on the second interaction page.

16. A method for real-time information interaction, comprising:

sending an interaction request from a main client;

presenting, in response to the interaction request, a question text and a first operation result for the question text on a main display page of the main client, wherein the first operation result is obtained from a first auxiliary client in an application group corresponding to the main client, wherein the main client corresponds to a client of an anchor of a question and answer interaction and the first auxiliary client corresponds to a client of an audience user participating in the question and answer interaction;

presenting a main interaction page, wherein the main interaction page comprises a plurality of option controls corresponding to the question text;

detecting a second operation result for the plurality of option controls on the first interaction page; and presenting a display content associated with the second operation result.

17. The method according to claim 16, wherein the first operation result is obtained from operations on an auxiliary interaction page presented in the first auxiliary client, wherein the auxiliary interaction page comprises the question text and a plurality of option controls corresponding to the question text.

18. A computer device, comprising a processor, a memory, and a computer program stored on the memory, wherein the processor executes the computer program to implement steps of the method for real-time information interaction according to claim 16.

19. A non-transitory computer-readable storage medium, wherein a computer program is stored thereon, the computer program, upon execution by a processor, causes the processor to perform steps of the method for real-time information interaction according to claim 16.

20. An apparatus for real-time information interaction, comprising:

a transmission unit configured to send an interaction request from a main client;

a display unit configured to, present, in response to the interaction request, a question text and a first operation result for the question text on a main display page of the main client, wherein the first operation result is obtained from a first auxiliary client in an application group corresponding to the main client; present a main interaction page, wherein the main interaction page comprises a plurality of option controls corresponding to the question text, wherein the main client corresponds to a client of an anchor of a question and answer interaction and the first auxiliary client corresponds to a client of an audience user participating in the question and answer interaction;

a detection unit configured to detect a second operation result for the plurality of option controls on the first interaction page; and the display unit is further configured to present a display content associated with the second operation result.

\* \* \* \* \*